United States Patent [19]

Long

[11] Patent Number: 5,190,098

[45] Date of Patent: Mar. 2, 1993

[54] THERMOSYPHON WITH EVAPORATOR HAVING RISING AND FALLING SECTIONS

[76] Inventor: Erwin L. Long, 5741 College Dr., Anchorage, Ak. 99504

[21] Appl. No.: 863,193

[22] Filed: Apr. 3, 1992

[51] Int. Cl.$^5$ .............................................. F28D 15/02
[52] U.S. Cl. ................... 165/104.22; 165/45; 165/46; 165/104.29
[58] Field of Search .............. 165/45, 104.29, 46, 165/104.22

[56] References Cited

U.S. PATENT DOCUMENTS

| | | | |
|---|---|---|---|
| 3,217,791 | 11/1965 | Long | 165/45 |
| 3,817,321 | 6/1974 | von Cube et al. | 165/104.22 |
| 4,961,463 | 10/1990 | DenHartog et al. | 165/45 |

FOREIGN PATENT DOCUMENTS 545184  5/1942  United Kingdom ........... 165/104.22

Primary Examiner—Albert W. Davis, Jr.
Attorney, Agent, or Firm—Heller, Ehrman, White & McAuliffe

[57] ABSTRACT

A thermosyphon for removing heat from a permafrost foundation is composed of a sealed container containing an easily vaporizable liquid. The container has a condenser part, which is exposed to temperatures below the condensation temperature of the liquid, and an evaporator part in which the liquid is intended to boil. The evaporator part is of double-tube structure with a supply tube and a return tube connected to each other at a point distal from the condenser part. The return tube has a riser with an opening at one end which is inside the supply tube and has a much smaller cross-sectional area than the supply tube around it. The tubes may have both rising and falling sections but the opening of the riser is sufficiently higher than these sections of the tubes such that the hydrostatic pressure causes the liquid in the evaporator part to flow from the supply tube into the return tube as the liquid forms bubbles in the evaporator part and overflows from the riser opening.

7 Claims, 1 Drawing Sheet

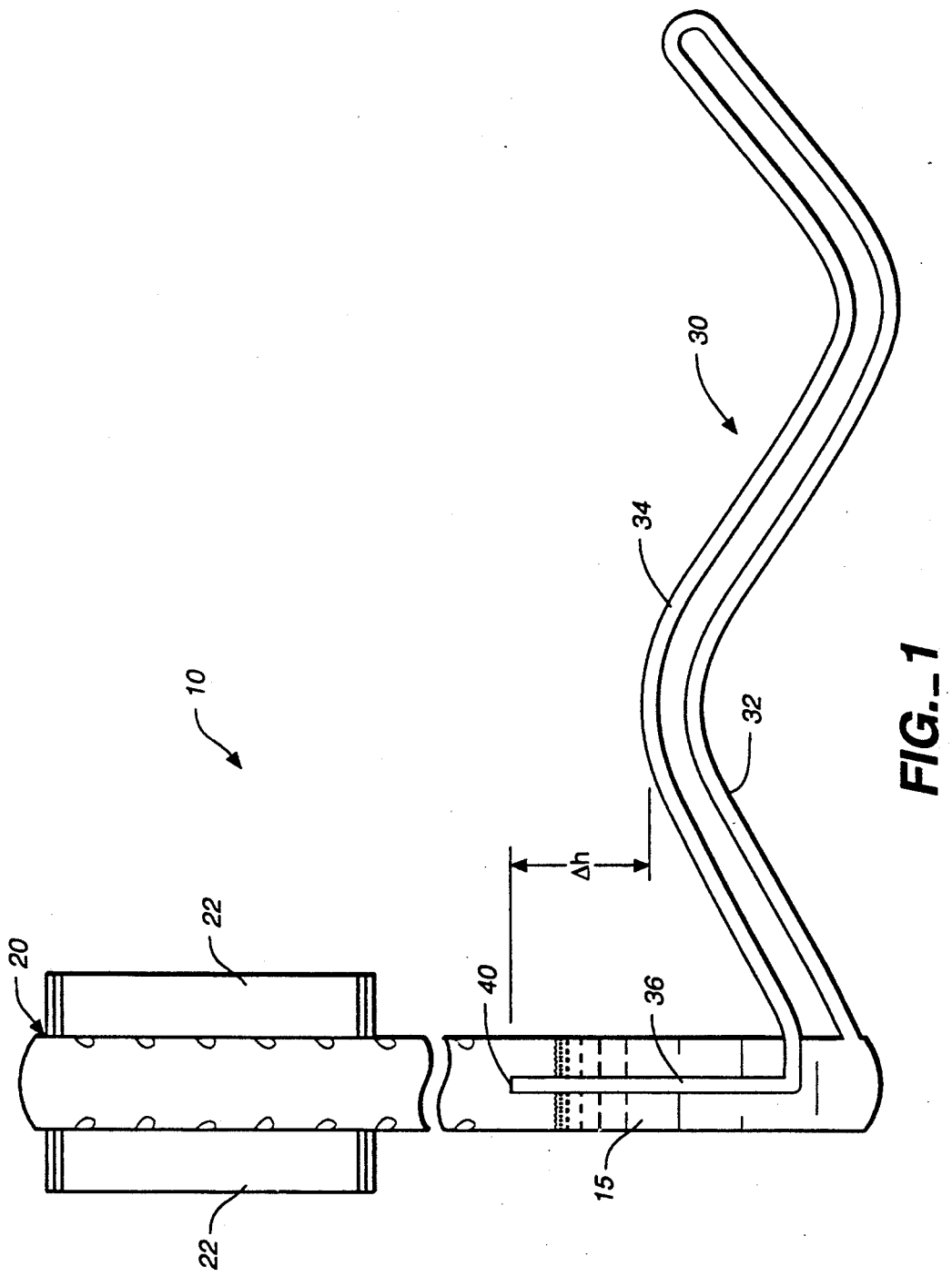

THERMOSYPHON WITH EVAPORATOR HAVING RISING AND FALLING SECTIONS

BACKGROUND OF THE INVENTION

This invention relates generally to a heat exchange device, or a thermosyphon. It relates, more particularly, to a two-phase thermosyphon for removing heat from a permafrost foundation with an evaporator which may have both positively and negatively sloped, or rising and falling, sections.

It has been known to use a gravity-controlled two-phase thermosyphon for maintaining a permafrost foundation system by extracting heat from the ground and radiating it out to the atmosphere whenever the atmospheric temperature is below that surrounding its evaporator. Such a thermosyphon operates on the physical principles that (1) a vapor of any substance is lighter than its liquid state, (2) the vapor pressure is generally increased with an increase in temperature, and (3) the vapor density at a constant volume decreases with a reduction in temperature. E. L. Long U.S. Pat. No. 3,217,791, issued Nov. 16, 1965, discloses a thermosyphon which operates on these principles, comprising a sealed container partially filled with a liquid having a low boiling point. Vapor from this liquid is caused to rise and condense in a vertically elongated upper heat-dissipating portion of The container when the temperature is below the freezing point, thereby lowering the vapor pressure inside the container. This causes boiling of the liquid in the lower portion of the container with a consequent reduction in temperature, and heat flows from the surrounding permafrost to the container.

One of the requirements for such a heat exchange device to work as described above is that the condensate liquid be able to flow the full length of the lower liquid-evaporating portion of the container. In other words, it is necessary to provide a wetted surface along the full length of the evaporator. In the case of a very long evaporator, however, this means an increased depth of burial within the permafrost, and such burial adds great expense to the overall cost of the installation.

For many applications, on the other hand, it is preferable to install the evaporator of such a thermosyphon substantially horizontally, say, on a level surface. Den-Hartog, et al. U.S. Pat. No. 4,961,463, issued Oct. 9, 1990, discloses a thermosyphon with a condensate return tube running along the entire length of the evaporator to its distal end such that heat can be removed from a permafrost foundation or the like even when its evaporator section is disposed horizontally or at a "negative slope" (that is, sloping upwards as one moves away from the condenser section). This device, however, cannot be operated on a "positive slope" (which rises as one moves away from the condenser section) except from an overflow portion, if any, of the liquid from its condensate-collecting device. In other words, great care must be taken in the installation of such a device in order to make certain that its evaporator should not only be horizontal or negatively sloped when it is first installed but also remain so in spite of the differential settlement and/or heave that may occur after installation and prior to or after beginning of its operation. If rising and falling sections develop in such a prior art evaporator, liquid condensate may not be able to move beyond the first slope-reversing point from each end, and little or no cooling may take place over the majority of the evaporator section. Where there are existing obstructions, furthermore, it may be desirable, or even imperative, to install an evaporator with rising and falling sections to bypass such obstructions.

SUMMARY OF THE INVENTION

It is a general object of the present invention to provide a thermosyphon which can effectively and dependably remove heat from a permafrost foundation.

It is a more specific object of the invention to provide a thermosyphon capable of operating effectively and dependably although its elongated evaporator is installed with, or later develops, both positively and negatively sloped (that is, both rising and falling) sections.

A thermosyphon embodying the present invention, with which the above and other objects can be accomplished, also consists essentially of an easily vaporizable liquid and a sealed container with a vertically oriented condenser part and an elongated evaporator part, but the evaporator part is of double-tube structure with a supply tube and a return tube which are flexible and may be installed with, or later develop, both positively and negatively sloped sections. These two tubes are joined together and open to each other at a distal end point away from the condenser part. The other end part of the return tube, proximal to the condenser part, is formed as a riser inside the supply tube. The riser part of the return tube has a much smaller cross-sectional area than the supply tube, and has an upwardly facing opening. When the thermosyphon is installed, it is made certain that this opening of the riser will remain sufficiently higher than any point in rising or falling section of the evaporator part which may exist at the time of the installation or may develop later due to natural causes such as differential settlement and heave. The height of the riser is determined such that a wetted surface can be provided along the full length of the evaporator when the liquid begins to boil and bubbles are formed inside the tubes, causing the liquid to flow from the supply tube through the distal point to the return tube due to the difference in hydrostatic pressure in them.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings, the FIGURE is a schematic sectional view of a thermosyphon embodying the present invention.

DETAILED DESCRIPTION OF THE INVENTION

In the accompanying FIGURE, a thermosyphon embodying the present invention is generally indicated by numeral 10, and consists essentially of an easily vaporizable liquid 15 and a sealed container which has a condenser part 20 and an evaporator part 30 and contains the liquid 15 therein. The condenser part 20 is of a vertically elongated tubular structure. Cooling fins 22, which serve as a radiator, may be provided on the external surface of the condenser part 20.

The evaporator part 30 according to this invention is characterized as being of double-tube structure with one tube (herein referred to as the supply tube 32) providing a path for the liquid 15 to travel radially outward from the bottom part of the condenser part 20 to a distal point and another tube (herein referred to as the return tube 34) to provide a separate path for the liquid 15 to travel back from the distal point to the bottom of the condenser part 20. As shown schematically in the FIGURE, these two tubes 32 and 34 are joined together such that the liquid 15 can freely flow from one into the other. Since the supply tube 32 and the return tube 34, according to the present invention, are allowed to be installed with, and/or to later develop both positively and negatively sloped sections, they may preferably be made of a flexible material such as copper such that large lengths thereof can be conveniently transported in coils.

At the opposite end (that is, away from the distal end), the supply tube 32 connects to and open into the bottom part of the vertical cylindrical tube, the top portion of which serves as the condenser part 20. The return tube 34, on the other hand, connects to a vertically extending return tube riser 36 with an upwardly facing top opening 40. The cross-sectional area of the return tube riser 36 is substantially smaller than the cylindrical tube which surrounds it. The liquid 15 fills the supply tube 32 and the return tube 34 to such an extent that its top level is slightly below the top opening 40 of the return tube riser 36.

The thermosyphon 10, thus structured, is installed such that the condenser part 20 is normally in an environment having a temperature below the condensation temperature of the liquid 15. For practical applications, it is normally above the ground level. The evaporator part 30, on the other hand, is disposed below ground, and typically within a permafrost foundation, or a permafrost which may be locally heated. Accordingly, the evaporator part 30 of the thermosyphon 10 is subjected to a temperature which is relatively warm with respect to the environment surrounding the condenser part 20. The liquid 15 is thus caused to evaporate inside the evaporator part 30, forming bubbles within both the supply tube 32 and the return tube 34. The bubbles formed inside the supply tube 32 cause the liquid 15 to rise in the annular space around the return tube riser 36. The bubbles formed inside the return tube 34 cause the liquid 15 to rise inside the riser 36, but since the cross-sectional area of the riser 36 is significantly smaller than that of the annular space therearound, the surface level of the liquid 15 rises faster inside the riser 36 than outside, and the liquid 15 inside the riser 36 soon spills over its top opening 40, thereby reducing the hydrostatic pressure inside the return tube 34 and simultaneously increasing that inside the supply tube 32. The fact that the cross-sectional area of the riser 36 is substantially smaller than the annular area outside serves to ensure that the density of the liquid-vapor mixture will be much less inside the riser 36 than outside. As a result, the liquid 15 keeps overflowing from the top opening 40 into the supply tube 32, as soon as the bubble formation starts inside the evaporator part 30, causing the liquid 15 to flow from the supply tube 32 into the return tube 34 through the distal point at which they are joined together. The greater the flow rate through the evaporator part 30, the greater the difference in the hydrostatic pressure between the tubes 32 and 34.

In the meantime, the resulting vapor moves up from the evaporator part 30 into the condenser part 20. The vapor of the liquid 15 is then condensed within the condenser part 20 upon exposure to relatively colder temperatures below its condensation temperature. The condensed liquid drains from the condenser part 20 back into the evaporator part 30 to thereby begin a new heat exchange cycle.

It is to be noted that, unlike the prior art thermosyphon described above which required the evaporator to be installed so as to have only a negatively sloped (rising) or negatively sloped (falling) section or to be completely horizontal along the entire length thereof, the evaporator part 30 of the thermosyphon 10 according to the present invention may have both rising and falling sections within a certain limit. This limit is determined in part by the differential fluid level $\Delta h$ (that is, the liquid level inside the thermosyphon 10 as measured from the highest point inside the supply and return tubes 32 and 34).

In designing the thermosyphon 10, care must be taken such that this differential fluid level $\Delta h$ be sufficiently large such that the hydrostatic pressure caused thereby be sure to exceed the dynamic pressure caused by resistance against flow of the liquid 15 through the system. Care must also be taken so as to prevent vapor locking of the system high points by properly taking into consideration the tube diameter, liquid viscosity, surface tension and slug flow of the liquid portions.

The invention has been described above by way of only one example, but this example is intended to be illustrative of the invention, not limitative. The FIGURE, in particular, is intended to be schematic and is not intended to show preferred shapes or dimensional relationship of various components. Many modifications and limitations that may be apparent to a person skilled in the art are intended to be within the scope of the invention. For example, the evaporator part 30 need not be made of copper. It may be constructed of steel or other materials which will meet pressure, corrosion, flow, cold topping and quality control requirements. The tubes 32 and 34 of the evaporator part 30 may be concentric under certain circumstances. On the other hand, they need not be substantially parallel to each other as shown in the FIGURE. In summary, the disclosure is intended to be broadly construed.

What is claimed is:

1. A thermosyphon comprising:
   a sealed container having a condenser part and an evaporator part; and an easily vaporizable liquid inside said sealed container;
   said evaporator part including a supply tube and a return tube, said tubes having a vertically extending section and a laterally extending section, said laterally extending section being of thermally conductive material and extending laterally from said vertically extending section to a distal point and being allowed to include both positively and negatively sloped flexible tubular sections, said tubes being in mutually liquid-communicating relationship at said distal point, said vertically extending section of said return tube having an upwardly facing opening, being inside said supply tube and having a substantially smaller cross-sectional area than said supply tube at said vertically extending section, said opening being sufficiently higher than said laterally extending part of said tubes such that the hydrostatic pressure inside said tubes causes said liquid to flow from said return tube through said distal point into said supply tube when said liquid boils inside said evaporator part.

2. The thermosyphon of claim 1 wherein said condenser part comprises a vertically elongated cylindrical structure.

3. The thermosyphon of claim 2 wherein said supply tube connects with said cylindrical structure so as to receive said liquid condensing inside said condenser part.

4. The thermosyphon of claim 2 wherein said structure has an external surface and said condenser part further comprises radiator means for radiating heat from said external surface of said structure.

5. The thermosyphon of claim 1 wherein said supply tube and said return tube are disposed in side-by-side relationship with respect to each other in said laterally extending section 6. The thermosyphon of claim 1 wherein said liquid has condensation temperature below the temperature of said condenser part and boiling point above the temperature of said evaporator part.

7. The thermosyphon of claim 1 wherein said supply tube and said return tube are joined together and opening to each other at said distal point.

* * * * *